United States Patent [19]

Yello

[11] 4,193,120

[45] Mar. 11, 1980

[54] ADDRESSABLE EVENT DISPLAY AND CONTROL SYSTEM

[75] Inventor: Joseph F. Yello, Wooddale, Ill.

[73] Assignee: Zenith Radio Corporation, Glenview, Ill.

[21] Appl. No.: 942,091

[22] Filed: Sep. 13, 1978

[51] Int. Cl.$^2$ .......................... H04N 5/76; G06F 9/10
[52] U.S. Cl. ............................... 364/900; 179/100.11;
358/127; 360/33; 364/104; 455/179
[58] Field of Search ............................... 364/900, 104;
179/100.11; 325/464; 358/4, 127; 360/1, 6, 19, 27, 33

[56] References Cited

U.S. PATENT DOCUMENTS

| | | | |
|---|---|---|---|
| 3,994,019 | 11/1976 | Sagishima et al. | 179/100.11 X |
| 4,023,107 | 5/1977 | Tanaka | 325/464 |
| 4,031,548 | 6/1977 | Kato et al. | 358/127 X |
| 4,070,698 | 1/1978 | Curtis et al. | 179/100.1 PS X |
| 4,071,745 | 1/1978 | Hall | 364/104 |

Primary Examiner—Jerry Smith

Attorney, Agent, or Firm—Cornelius J. O'Connor

[57] ABSTRACT

An addressable event display and control system for use with a clock controlled programmable memory employs an array of LED's as event designators each of which signifies, when energized, a programmed event in the memory. A bank of seven dual LED's, which is coupled to the memory, is selectively energizable to visually indicate a particular day of the week. When a particular day is selected, the array of designators for that day can be interrogated to determine which of the designators have been programmed for the particular day. Thereafter, a desired one of the designators can be selected to afford review of the program content of the event associated with that designator. The selected event designator is identified by a blinking visual signal. The time of day, a channel and a recording duration time are selectable to identify a particular event and that information is programmable into the memory for subsequent retrieval to control a video frequency recorder in accordance with such information.

9 Claims, 4 Drawing Figures

ADDRESSABLE EVENT DISPLAY AND CONTROL SYSTEM

BACKGROUND OF THE INVENTION

This invention relates in general to a timer-controlled programmable memory, but is more particularly concerned with an addressable program display and control system for use in connection with such a memory to control a video tape recorder.

The use of clock controlled timers for regulating the operation of pre-programmed consumer products, such as washing machines, dishwashers, etc., is well known. The particular sequence of operations programmed into the timer follows a predetermined routine with, of course, some variance permissible where it is desired to shorten, or even skip, a particular event in the overall program.

In general, the timer mechanism is actuated by accessible selectors, or switches, that enable the operator to initiate the program, in its entirety, as well as to eliminate portions thereof by positioning the controls to select only desired functions, or portions thereof. For example, in the case of a washing machine, a pre-soak, a wash, a rinse or even a dry cycle can be shortened, or even eliminated, by simply adjusting the appropriate function selector. Insofar as flexibility is concerned, these mechanisms simply permit an altering of a previously built-in program.

In the field of video recording, it is readily appreciated that a programmable timer for controlling the recorder is highly desirable since an obvious advantage of such an arrangement resides in its ability to permit recording of a television program when the viewer is not present. Insofar as programmable timers are concerned, it is known to use a timer of the type employed for turning house lights on and off at predetermined hours when the residents are absent. Such a timer, adopted for use with a video recorder, would be preset to energize the video recorder at the commencement of the desired program and thereafter to de-energize the recorder at a second preset time. Since such a timer is a "24 hour" device, an obvious shortcoming resides in the fact that, unless it is re-programmed daily, it will continue to repeat its preset program on each succeeding day. Obviously, such an arrangement would have no utility in exerting selective control over a video recorder beyond 24 hours, for example, if one were to be away over a weekend and desired different programming for Friday and Saturday, or Saturday and Sunday.

It is also known to employ a timer which will initiate operation of a tape recorder at a predetermined time and then relinquish control to the recorder which will de-energize itself when the end of the tape is reached. An obvious disadvantage here is the lack of a selectable turn-off time which results in recording of undesired material. Moreover, this is also a "one-shot" mechanism which daily repeats its program.

OBJECTS OF THE INVENTION

Accordingly, it is a general object of the invention to provide an improved event display and control system for use with a clock controlled programmable memory.

It is also an object of the invention to provide a readily addressable event display and control system for use with a programmable memory controllable video tape recorder.

It is a further object of the invention to provide an addressable program display and control system that permits display, identification and editing of any of a multitude of television events programmed throughout a week.

It is another object of the invention to provide an addressable program display and control system having a flexibility and versatility not found in prior art video recorder control arrangements.

SUMMARY OF THE INVENTION

An addressable event display and control system is disclosed for use with a clock controlled programmable memory having the capability of storing a multitude of time regulated program events. These events are utilized, chronologically, for controlling a video tape recorder; the content of each event comprising a plurality of pieces of information. To this end, the event display and control system comprises an array of light emitting devices which are coupled to the memory, each of these devices constitutes an event designator that signifies, when energized, storage of a programmed event in the memory. A bank of light emitting day-of-the-week indicators is also coupled to the memory, as well as to the array of event designators, and the indicators are selectably energizable to visually identify a particular day. There are means for selecting a particular one of the day indicators and means responsive to selection of the particular day indicator for interrogating the array of event designators of ascertain which of the designators have been programmed for the particular day. Means are provided for selecting a desired one of the event designators of the particular day to afford review of the program content of the selected designator. Visual signaling means, responsive to the designator selecting means, identifies the selected event designator. Programming means, including visual readout means, serve to select and visually display the time, channel and recording duration, which information identifies the event to be associated with the selected event designator. Finally, means are included for entering the programmed information into the memory for subsequent retrieval upon the selected day to control the tape recorder.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in conjunction with the accompanying figures, in the several figures of which like reference numerals identify like elements, and in which:

FIG. $1_A$, $1_B$ and $1_C$ collectively depict a schematic representation of a clock controlled programmable memory system for use in controlling the operation of a video tape recorder.

DESCRIPTION OF THE PREFERRED EMBODIMENT

Figure 2:
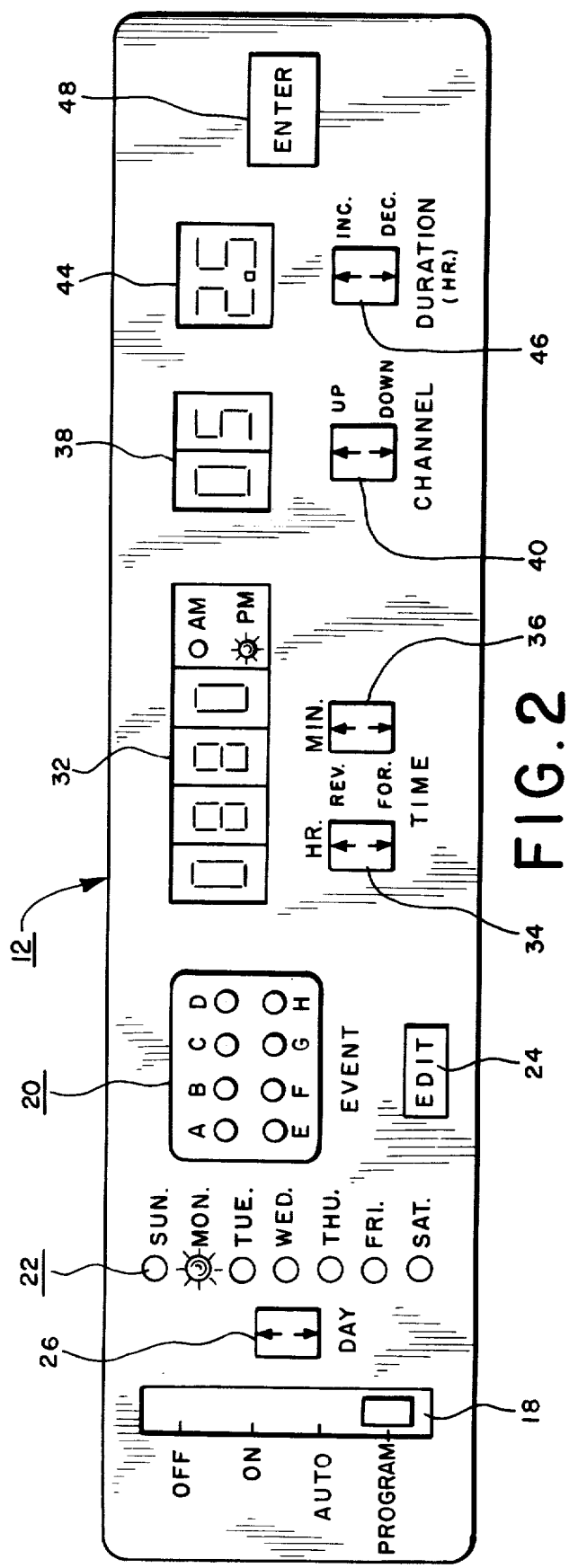
FIG. 2 is a layout of an addressable event display and control panel for use with the programmable memory of FIGS. $1_A$-$1_C$.

The layout of an addressable event display and control system 10 for use with a clock timer and a programmable memory, the latter having the capability of storing and recalling a multitude of program events, each being defined by a plurality of pieces of information, is depicted in FIGS. $1_A$–$1_C$. The event displays and the controls for system 10 are conveniently grouped on a panel 12, see FIG. 2. As will be shown, the memory, under the direction of the stored events, controls the operation of a cassette type video tape recorder (VCR). The major components of system 10 include a clock timer 14, an eight-stage memory 16 as well as a number of gates, decoders, comparators, binary counters, etc., all to be identified subsequently. The purpose of this system is to store, recall and utilize a multitude of programmed events which, in a particular embodiment of the invention, can comprise up to eight program events for each day of the week (i.e., up to fifty-six events per week). The events are subsequently recalled, in chronological order, to control the record mode of the VCR. The content of each program event includes the day of the week and the time of that day when recording is to commence, identification of the channel to be recorded and the length of time, or duration, the VCR is to remain in the record mode.

To this end, panel 12 comprises a slide-type, if desired, master control and function selector 18 which is adjustable from OFF to ON to AUTOMATIC to PROGRAM positons. An array 20 of dual (Green/Red) LED's (light emitting diodes) constituting event designators is mounted on the panel which array, as shown in FIG. $1_C$ is coupled to memory 16. As seen in that Figure, each designator of array 20 has an identifier (A thru H) associated therewith. These designators signify, when energized, storage of an event in the memory. Dual LED designators are employed since GREEN, for example, can serve to indicate that the stored event is a morning (AM) program, or at least one that commences in the morning, while RED would signify that the event is an afternoon (PM) program, or one commencing therein.

A bank 22 of day-of-the-week indicators, also mounted on panel 12, comprises a plurality of monochrome LED's which are coupled to the memory and to the array 20 of event designators so that when a particular day is selected, the event designators that have been assigned a program on that day, and only those, will be illuminated. The contents of the illuminated designators are reviewable through a push-to-actuate EDIT control 24 situated on the panel which control, upon actuation and in a manner to be described, serves to address the memory in a step-fashion so that the event designators of array 20 are sequentially interrogated. As will be shown, if an event has been stored in the memory address associated with the designator under interrogation, then, the content of that event will be concurrently displayed on panel 12. Desirably, as a locator aid for the operator, the event designator instantaneously being interrogated will blink, if there is a stored event associated with that designator.

More particularly, the day-of-the-week is selected by recourse to a toggle type DAY selector 26, also located on the panel, which applies the output of a 2 Hz oscillator $F_1$, preferably via a switch 25 and a converter 27, to a seven-step, self-resetting (0 to 6) up/down binary counter 28, see FIG. $1_B$. Switch 25 is displaceable between an AUTOMATIC (A) position and a Program (P) position, so that only in the latter position is the output of oscillator $F_1$ available to counter 28. By virtue of its intercoupling role, converter 27 serves to resolve any problem respecting dc level considerations at the input terminals of counter 28. Insofar as selector 26 is concerned, displacing it downwardly causes counter 28 to increment a (1 to 7) decoder 30 in a forward direction which, in turn, causes the bank 22 of day indicators to sequentially illuminate in chronological order, i.e., SUN, MON, TUE, etc., through the seven days of the week. On the other hand, displacing selector 26 upwardly increments counter 28 and decoder 30 in the opposite direction so that the bank of indicators again illuminates sequentially, but this time in an opposite sense, i.e., SUN, SAT, FRI, etc. Accordingly, and in this fashion, the day-of-the-week address into the memory is selected. In practice, counter 28 comprises feedback circuitry which is designed to reset the counter to zero after it counts to seven, i.e., 0–6.

Panel 12 further includes a conventional seven-segment readout 32 for clock 14 as well as a pair of time select switches 34, 36 for setting hours and minutes, respectively. Time is set forward by displacing these switches downwardly (FORward) or, in the opposite direction, by displacing the switches upwardly (REverse).

Another panel mounted seven-segment readout 38 specifies the channel information that is, or will be, stored in the memory for the particular day and hour displayed on the panel. Channel selection for entry into the memory is achieved by the channel select control 40 disposed beneath readout 38 which control, as indicated, comprises a two-way (UP/DOWN) switch that is coupled to a VHF/UHF tuning system 42 associated with the VCR, see FIG. $1_A$.

A third seven-segment readout 44 also mounted on the panel display discloses the duration of the record mode for the particular event displayed by the panel. Record time is selectable in one-half hour increments, up to a total of six hours, by a toggle type control 46 which is displaceable for selectively increasing or decreasing the duration of the record mode.

Finally, panel 12 is provided with a push-to-actuate ENTER control 48 which, when pressed, inserts the selected program information into the memory where it is stored subject to recall for activating the VCR.

At this juncture it will be noted that there is extensive mechanical intercoupling between the multitude of switches and gates which control the counters, decoders, etc., included in the memory system. This intercoupling, which is represented by the broken construction line 50, is intended to schematically depict the interrelationships of certain functions of the memory system and the manner in which master switch 18 excercises control thereover. In practice, intercoupler 50, in response to actuation of control 18, serves, essentially, to condition elements of the memory system to function between (1) a Programming mode (P) in which event information is inserted (ENTER) into the memory or, in which stored information is reviewed (EDIT), and (2) an Automatic mode (A) during which the stored event information is retrieved under the command of clock timer 14 and employed to control the tuner and energizing circuitry of the VCR. As a practical matter, the switches, gates, etc., interconnected by coupler 50 remain in the designated (A) mode for all positions (i.e., OFF, ON & AUTO) of master switch 18 except the program (P) position. In all such positions, except (P), clock readout 32 will display "real" time while channel display 38 and duration display 44 will be blank.

Additional aspects of the programmable memory system of FIGS. $1_A$–$1_C$ will now be discussed. Clock timer 14 can comprise a state of the art monolithic digital alarm clock circuit which utilizes a 60 Hz line signal as its timing base. Such clocks provide a 24 hour format and can include, among other features, an output circuit for driving a Binary Coded to Decimal 7-segment (BCD/7) decoder 52 which, in turn, activates time display 32.

As shown in FIG. $1_A$, the hours and minutes time select switches 34, 36 are depicted simply as external controls for the clock. Issuing from the REF terminal of the clock is a reference signal which is applied through a switch 54, FIG. $1_B$, to an input terminal of converter 27. In functioning as a reference signal source, the clock issues a pulse every twenty-four hours, @ 12:00 AM, which affords the necessary reference against which "real" time, as well as event or programmed times are calculated.

In this regard, the 24 hour reference signal REF from clock 14, is observed to be decoupled from converter 27 and counter 28, only when switch 54 is in the (P) position. As shown, switch 54 is ganged to intercoupler 50 and therefore is subject to master control 18. As a result, the REF signal is made available to the binary counter, not only when switch 54 is in the (A) position, but also when the master control switch 18 is in the ON, as well as OFF, positions. This obtains because the clock timer 14 serves not only as a controller for the memory but also has the capability of providing "real" time for readout display 32 whenever master control 18 is in any position except PROGRAM. This is achieved by virtue of a Timer Run circuit incorporated in clock 14 which takes over control of the internal clock counter whenever master control 18 conditions clock 14 for the (P) mode. In other words, the Timer Run circuit maintains real time internally in the clock during the (P) mode, i.e. at such times as the hours and minutes controls 34, 36 are employed to select a program time for a desired event to be entered into memory 16.

Accordingly, when the master control 18 is located in any position other than PROGRAM (P), "real" time, in binary format, is made available via a time inhibit transmission gate 55 to the BCD/7 decoder 52 which drives time display 32. Gate 55 is controlled by a source 53 of high (H) and low (L) level logic signals. The output of source 53 is (H) at all times, i.e., ENTER, (P) and (A) modes, except during the EDIT mode when it is intermittently (L). Gate 55 is rendered transmissive in response to a logic (H) signal, but otherwise in response to intermittent logic (L). The output of the clock is also applied to a time input terminal $T_{in}$ of memory 16 through the transmission gate 56 which is controlled by an AND gate 57. One input terminal of gate 57 is returned to logic source 53 while its other input terminal is returned to a fixed source of high logic $E_H$ through a switch 58 which is ganged to intercoupler 50. The output terminal of AND gate 57 is connected to transmission gate 56 so that when switch 58 is displaced from its (A) position to its (P) position, high logic (H) signals are applied to both inputs of gate 57 permitting gate 57 to enable transmission gate 56 so that the output of the clock, as represented by a binary coded signal, is applied to the $T_{in}$ terminal of the memory. Accordingly, with the memory system in the (P) mode, when the hours and minutes controls 34, 36 of the clock are adjusted, the selected time, which is simultaneously displayed on readout 32, will be inserted into memory 16 when ENTER control is pressed.

This stored program time is subsequently available for review or edit at the $T_o$ terminal of the memory. The binary coded signal corresponding to this time is applied to decoder 52 through a time-out transmission gate 59 which is enabled by an output signal from an inverter 60. The input for this inverter is obtained from the output of a NAND gate 61 which, in turn, has one of its input terminals connected to the output of a flip-flop, or multi-vibrator 49. Preferably, this flip-flop comprises a divide-by-two device, the output state of which changes only in response to a positive-going input pulse. The other input terminal of gate 61 is connected to the input of the flip-flop.

Memory 16 also stores, in a binary coded format, information that identifies the channel selected for a particular program event. To this end, the binary coded output of the VCR tuning system 42 is applied through a channel inhibit transmission gate 63, also controlled by the logic output of source 53, to a BCD/7 decoder 64. The output of decoder 64 is applied to the channel readout display 38. Since channel display is required only during channel selection, i.e., the Programming mode (P), decoder 64 is provided with a switch 39 that affords a connection between the decoder and an activating signal, source $E_H$, only when the switch is in the (P) position. As shown, switch 39 is displaceable between the (P) and (A) positions by virtue of being ganged to intercoupler 50.

Preferably tuning system 42 comprises an all-channel, all electronic television tuner in which channel selection is achieved by a digital logic system. Such a tuning system is described in U.S. Pat. No. 3,961,266 which issued to Akio Tanaka on June 1, 1976 and which is assigned to the assignee of the subject invention. The selected channel information is also coupled to the input terminal $C_{in}$ of memory 16, via a channel-input transmission gate 65 which is enabled by an AND gate 66. One input terminal of this gate is connected to source 53 while its other input terminal is returned to logic source $E_H$ via the switch 67 which is ganged to intercoupler 50.

The stored binary coded channel information signal is thereafter available at the channel output terminal $C_{out}$ of the memory. This binary output signal is coupled to decoder 64 via the channel-out transmission gate 62, which gate is enabled by a signal from the output of inverter 60.

Additional programming information, that is the length of time for which the record mode is desired, is established by a duration timer 69 which is controlled by selector switch 46. The selected duration time is applied via a decoder 70 and a duration-in transmission gate 71 to the input terminal $D_{in}$ of memory 16. Transmission gate 71 is enabled by the AND gate 72 which has one input terminal returned to logic signal source 53 and a second input terminal connectable through a two-position switch 73 to the logic signal source $E_H$. This switch is likewise ganged to intercoupler 50. In a manner to be described, an energizing signal for the VCR proper is made available at terminal $S_e$ of duration timer 69 for the duration of the programmed record time. This signal also serves to enable a tuning transmission gate 17 which couples the channel binary coded signal appearing at memory terminal $C_{out}$ to the VCR tuning system 42. The output of decoder 70 is simultaneously applied, via a duration-inhibit transmission gate 74, to a BCD/7-segment decoder 75 which activates duration display 44. Gate 74 is controlled by the logic signal derived from source 53. The record mode duration time inserted in the memory, in binary coded format by gate 71, is thereafter made available for review or edit purposes at output terminal $D_o$. This binary coded signal is coupled via the duration-out transmission gate 76 to the input of decoder 75, as well as back to duration decoder 70, through gate 74. To enable the aforesaid binary coded signal to function as a cut-off signal for timer 69, the feedback connection 77 between decoder 70 and timer 69 is provided. Gate 76 is controlled by the two-position switch 78, which switch is displaceable by intercoupler 50 between a (P) position in which the output of inverter 60 is applied to the gate and an (A) position in which logic source $E_H$ is applied to the gate. As in the case of the channel readout 38, a display of the length of record time for a selected event is required only while the event is being programmed. Therefore, an enabling switch 45 is provided for coupling the source $E_H$ of activating signal to decoder 75 when switch 45 is in its (P) position. This switch is also ganged to intercoupler 50.

Turning again to the binary (0 to 6) counter 28, as previously noted this device is activated by the low frequency oscillator $F_1$ which is coupled to the counter via converter 27 and the enabling switch 25 which, in turn, is actuated by master control 18 through intercoupler 50. Counter 28 maintains an output continuously and its day-to-day, or calendar, accuracy is maintained by the reference pulse issued by clock 14 once every twenty-four hours. The (1 to 7) decoder 30, which is driven by counter 28, selects a particular day-of-the-week address into the memory. Decoder 30 is coupled to a memory address preset circuit 79 by seven separate output circuits, each of which is associated with a particular day of the week and is so designated. The bank 22 of day indicating LED's is coupled between reference potential and the output circuits of decoder 30. More particularly, the cathodes of the LED's are connected in common and thence to reference potential while the anodes of the LED's are individually connected to an assigned day-of-the-week output circuit of decoder 30. As a result, when master control 18 is in any position, other than (P), the correct day of the week will be indicated by the assigned LED since decoder 30 maintains a continuous output signal.

As indicated in the drawing, memory addresses are assigned to each day of the week. More particularly, since the system is designed to store eight separate events for each day of the week, a total of fifty-six addresses ($0_a$ to $55_a$) are required, such addresses are designated as follows: SUN $0_a$–$7_a$, MON $8_a$–$15_a$, TUE $16_a$–$23_a$, WED $24_a$–$31_a$, etc. In order to program the memory, as well as to edit it, a memory address preset circuit 79 is provided which, in response to decoder 30, presets the 7-stage (SUN-SAT) WRITE counter 80 and the 7-stage (SUN-SAT) READ counter 81 so that they function, or count, only within the block of eight addresses associated with the day selected by counter 28 and decoder 30.

Figure 1A:
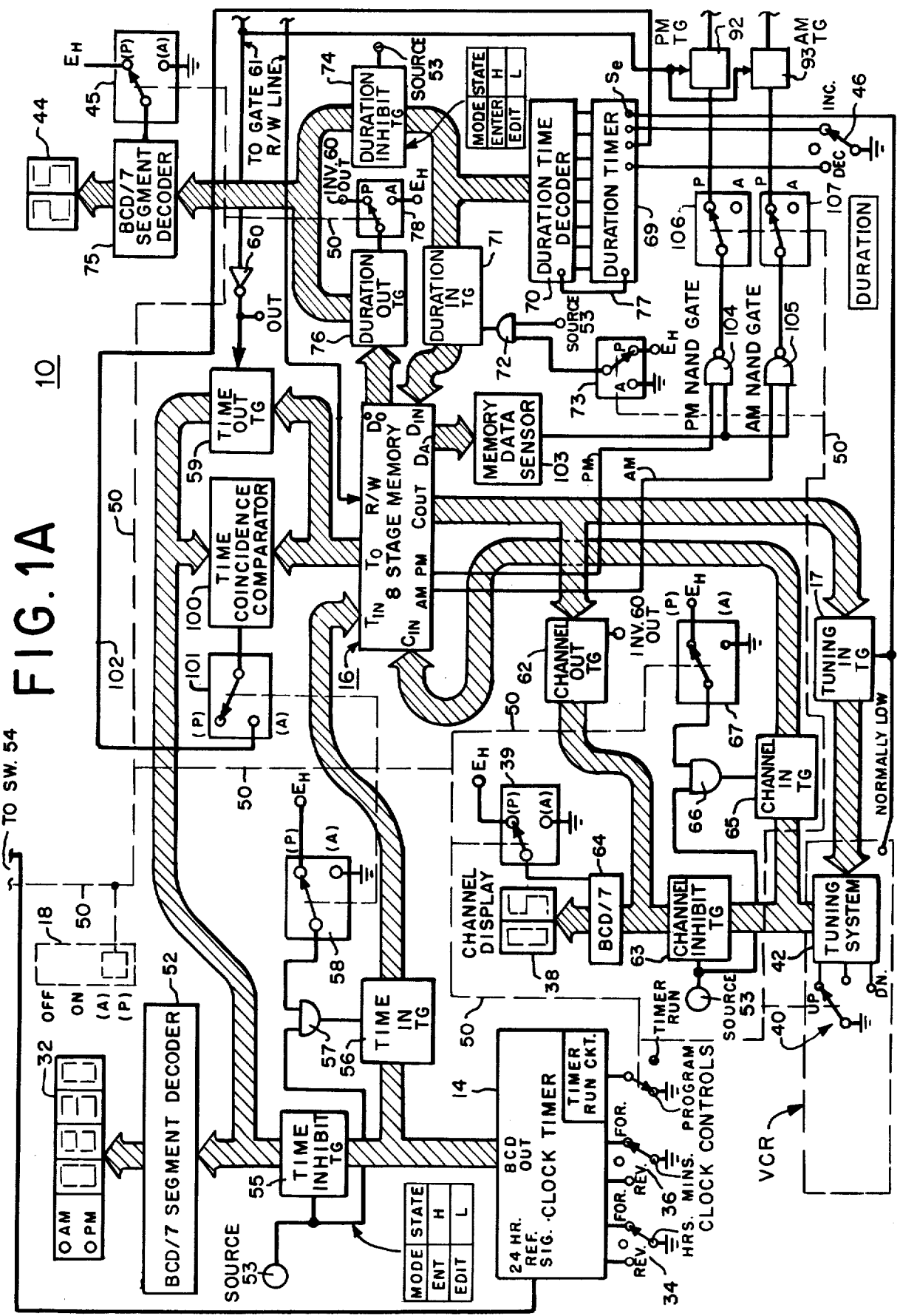
Figure 1B:
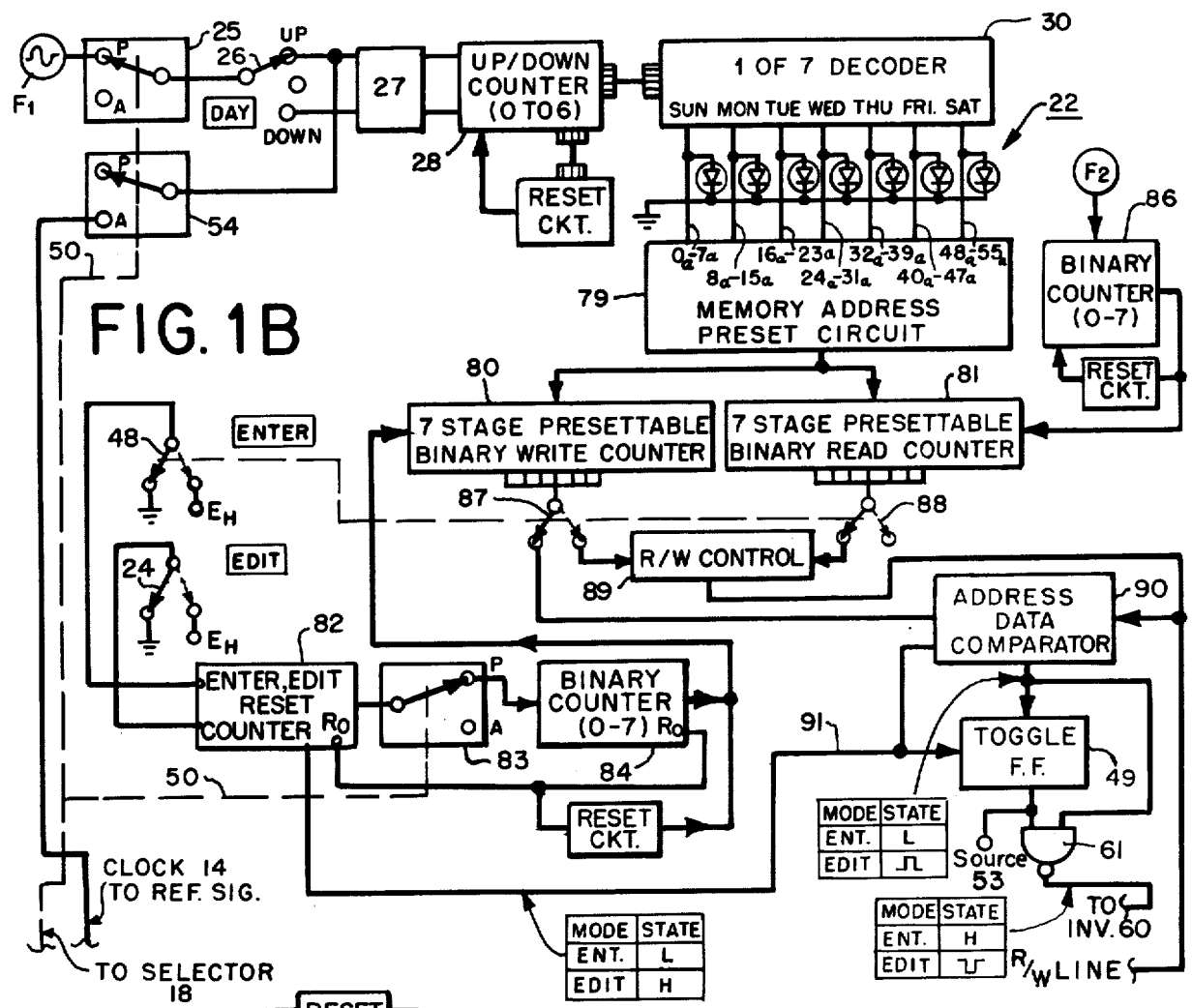
Figure 1C:
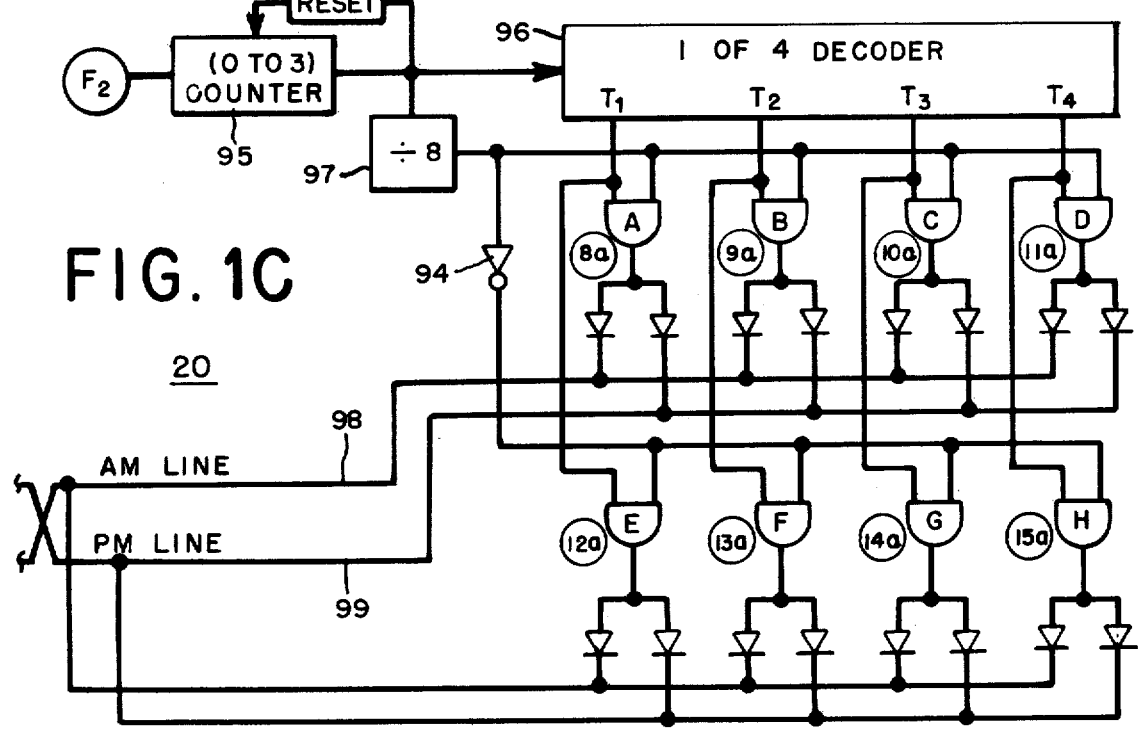

As shown in FIG. 1b, controls 48 and 24 institute the ENTER and EDIT functions respectively, of memory 16 and are associated with enter/edit/reset control 82. Stage 82 is actuated by either the ENTER or the EDIT control, each of which is connected to an assigned input circuit of that stage. As shown the ENTER and EDIT controls are displaceable from normal, or "OFF," positions, in which they maintain their respective input circuits at reference potential, to operating positions in which they couple their input circuits to the $E_H$ source of logic. Controls 24 and 48, which have been described as push-to-actuate devices, preferably comprise spring-loaded momentary switches which return to their normally "OFF" positions when released.

The output circuit of stage 82 is coupled through a switch 83, which is ganged to intercoupler 50, to a (0–7) binary counter 84. An output terminal $R_o$ of stage 82 is coupled to the reset terminal R of counter 84 so that the counter will reset to zero upon receipt of the first pulse of the pulse train initiated when the EDIT control 24 is actuated. Accordingly, whenever the PROGRAM (P) mode is instituted, and before any information is entered, the EDIT control 24 should be pressed to reset counter 82 to zero. The output of counter 84 is applied to an input terminal of the seven-stage presettable WRITE binary counter 80. As already noted, input circuits of presettable WRITE counter 80 and presettable READ counter 81 are connected to the output of the address circuit 79. READ counter 81 is continuously scanned by a self-resetting (0–7) binary counter 86 which, in turn, is driven by a 480 Hz oscillator $F_2$. By virtue of this oscillator drive, counter 86 repeatedly counts from 0 to 7 at a 480 Hz rate. As a result, eight signals is binary format, issue from counter 86 every 1/60th of a second.

WRITE counter 80 and READ counter 81 have their outputs connected via switches 87, 88, respectively, to assigned input terminals of a READ/WRITE (R/W) control 89. Note that switches 87 and 88 are ganged for coaction with ENTER control 48 to the end that when WRITE counter 80 is connected to R/W control 89, READ counter 81 is disconnected from that control and vice versa. The output of control 89 is applied to one input terminal of an address data comparator 90. A second input terminal of that comparator is returned to WRITE counter 80 through switch 87. The output of R/W control 89 is also applied to the R/W terminal of memory 16. By virtue of a connection 91 to the logic source 53 of enter/edit stage 82, data comparator 90 is enabled during the EDIT mode and disabled during an ENTER mode.

The output of comparator 90 is applied to an input terminal of the flip-flop 49 and to a first input terminal of NAND gate 61. A second input terminal of the flip-flop is returned to stage 82 via connection 91 so that the flip-flop is enabled during an EDIT mode and disabled during an ENTER mode. The output terminal of flip-flop 49 is connected to the second input terminal of NAND gate 61. As already noted, the output of gate 61, after translation by inverter 60, serves as the source of enabling signal for the "out" transmission gate 59, 62 and 76. The output of NAND gate 61, which is logic (H) during the (P) mode, is also applied to the control terminals of a PM transmission gate 92 and an AM transmission gate 93.

A self-resetting matrix (0–3) counter 95, also driven by the 480 Hz oscillator $F_2$, applies binary counting signals (0000, 0001, 0010, 0011) at a 480 Hz rate to a (1 of 4) decoder 96, the output terminals $T_1$–$T_4$ of which are connected to a first input terminal of each of AND gate pairs A,E; B,F; C,G and D,H respectively. Terminals $T_1$–$T_4$ are successively driven "on" (H) for one cycle of oscillator $F_2$ so that logic (H) signals are applied to the aforesaid first input terminals of all the AND gates at a 480 Hz rate. A divide-by-eight counter 97 applies the output of oscillator $F_2$ directly to a second input terminal of each of AND gates A, B, C and D and, via an inverter 94, to a second input terminal of each of gates E, F, G and H.

More particularly, since the frequency of the divider 97 output is less than that of $F_2$ oscillator by a factor of eight, one complete cycle of the divider signal will turn the second input terminals of AND gates A–D "on" (H) for four cycles of oscillator frequency (1/120 sec.) and then "off" (L) for the next four cycles. Conversely, because of the action of inverter 94, the second input terminals of gates E–H are turned "off" (L) when the second input terminals of gates A–D are "on" (H) but turned "on" (H) when the second terminals of gates A–D are "off" (L).

To recapitulate, in resorting to this mode of scanning, all the second input terminals of gates A–D are maintained "on" (H) for a period of time sufficient for each of the first input terminals of gates A–D to be successively gated "on" (H). Then, the aforesaid second input terminals are gated "off" (L) for the next four cycles of the $F_2$ oscillator. A similar, but converse, procedure applies to gates E–H in that those gates are successively gated "on" (H) during the period gates A–D are gated "off" (L). The end result is that for successive cycles of $F_2$ oscillator signals, each of the AND gates A–H is successively enabled and thereby generates a (H) logic signal at its output terminal.

Connected to the output terminal of each of AND gates A–H is an assigned dual LED, which LED's collectively constitute the array 20 of event designators. In particular, the anodes of each dual LED are connected to the output terminal of its associated AND gate; the cathode of the Green section each dual LED is connected via a common AM line 98 to a terminal of the AM transmission gate 93 while the cathode of the Red section of each LED is returned to a terminal of the PM transmission gate 92 via the common PM line 99.

Turning now to the output circuitry of memory 16, the time output terminal $T_o$ is connected to the input of a time coincident comparator 100 as well as to an input terminal of the time out transmission gate 59. Comparator 100, which compares the stored "on" time of a programmed event to "real" time, issues a control signal, via switch 101 and connection 102, to duration timer 69 when "on" and "real" time coincide. Switch 101, which has (A) and (P) terminals, is ganged for coaction with intercouplers 50.

All data stored in the memory, except AM/PM information, which has separately assigned output terminals, is made available to a data sensor 103 through memory output terminal $D_a$. The output of sensor 103 is applied simultaneously to one input terminal of a PM NAND gate 104 and to one input terminal of an AN NAND gate 105. The other input terminals of gates 104 and 105 are connected, respectively, to the PM and AM output terminals of memory 16. The outputs of gates 104 and 105 are coupled through respective switches 106 and 107 to the input terminals of PM gate 92 and AM gate 93. Switches 106 and 107 are ganged to intercoupler 50 for conjoint actuation between (P) and (A) modes by master control 18.

OPERATION

The operation of the system will now be described by first discussing the procedure for programming and storing an event in the memory. To this end master control and function selector 18 is displaced in the PROGRAM (P) position which readies memory 16, the counters and the decoders to develop and process binary coded information signals. This ready state is achieved through the agency of intercoupler 50 which displaces all interconnected switches from their (A) to their (P) positions. In particular, when switches 39 and 45 are so displaced they couple (H) logic energizing signals from source $E_H$ to decoders 64 and 75 to enable channel display 38 and duration display 44, respectively. When the (P) mode is instituted, the output of source 53 is established as a source of (H) logic and is applied to inhibit gates 55, 63 and 74 as enabling signals to permit translation of information to their respective display devices 32, 38 and 44. An (H) output from source 53 is simultaneously applied to one input terminal of each of AND gates 57, 66 and 72 while the other input terminal of each of those gates is connected to fixed logic source $E_H$ via switches 58, 67 and 73, respectively. With AND gates 57, 66 and 72 energized in this fashion, their respective associated transmission gates 56, 65 and 71 are enabled so that time, channel and duration information signals can be applied to memory input terminals $T_{in}$, $C_{in}$ and $D_{in}$. Additionally, switches 25, 54, 83, 101, 106 and 107 have been displaced to their (P) positions for purposes which are, or will be, self-evident. At this stage it is desirable to actuate the EDIT control 24 in order to reset address (0–7) counter 84 to binary zero output.

In the (P) mode, "real" time is removed from time display 32 and the Timer Run clock circuit, which is not coupled to display 32, takes over from the internal clock counter in order to preserve "real" time. Display 52 now serves as a read-out for displaying the selected turn-on time for the event to be programmed. The display also serves to read-out the turn-on time of any event already stored in the memory when the system is operated in the EDIT mode. After programming has been completed and control 18 is returned from the (P) to any other position, the Timer Run circuit is deactivated and the internal clock counter resumes control of "real" time and of display 32.

It will now be assumed, for purposes of illustration, that it is desired to commit to memory 16, for future recording by the VCR, a program of 2½ hours DURATION, which is to be aired on Channel 5 on Monday evening at 8:30 PM.

Accordingly, with switch 25 closed, the output of the 2 Hz oscillator $F_1$ is applied through selector 26 and converter 27 to the (0–6) DAY counter 28. This counter, which is controllable by selector 26 to count up or down, sequentially outputs seven binary coded signals (0000, 0001, 0010, etc.), one for each day of the week (Sunday-Saturday) and applies them to decoder 30.

The SUN-SAT output terminals of the (1 of 7) decoder 30 are normally LOW. However, upon receipt of a binary signal, a decoder output terminal will go HIGH. For example, upon receipt of the (0000) binary signal, the SUN terminal outputs HIGH, receipt of the (0001) signal causes the MON terminal to go HIGH (and SUN to go LOW) etc., so that the bank 22 of day-of-the-week LED's are caused to sequentially illuminate at a 2 Hz rate. In this manner, the particular day-of-the-week LED, to which the decoder output is instantaneously coupled, is visually identified. Therefore, at such time as the MON LED is illuminated, irrespective of which direction count was taken, the day selector switch 26 is released. The decoder output signals also serve to condition memory address preset circuit 79 for operation, specifically, circuit 79 presets the starting count for WRITE and READ counters 80, 81. More particularly, circuit 79, in response to a day-of-the-week binary signal, generates and applies to WRITE counter 80 and to READ counter 81 a signal representative of a preset address. For example when the binary output signal representative of Sunday is applied to the memory address circuit, that circuit presets counters 80 and 81 to memory address $0_a$. On the other hand, when the binary signal representative of Monday is applied to circuit 79, counters 80 and 81 are preset to $8_a$.

Accordingly, with addresses $8_a$–$15_a$ constituting available locations for the up to eight events that can be programmed for Monday, counters 80 and 81 are preset to start counting at address $8_a$. At this stage of the programming, the output of WRITE counter 80 is applied via switch 87 to the WRITE input terminal of address comparator 90 which, for the (P) mode, is disabled. Counter 81 on the other hand, has its output coupled through switch 88 to the READ input terminal of the R/W control 89.

In response to the scanning drive of oscillator $F_2$, counter 86 issues a binary signal for each cycle of the 480 Hz oscillator. Since counter 86 issues eight binary signals before resetting, it is obvious that the counter is being scanned at a 60 Hz rate (480/8). In this fashion, the (0–7) binary counter 86 is continuously scanned by oscillator $F_2$ to enable READ counter 81 to continually scan the memory from preset address $8_a$ through address $15_a$ to ascertain if an event is stored at any of those addresses. The presence of a stored event is manifested as follows. The addresses $8_a$–$15_a$ in memory 16 are scanned by virtue of the application of the scanned output of READ counter 81 via R/W control 89 to the R/W terminal of the memory. If there is complete data for an event stored at one of addresses $8_a$–$15_a$ then the data sensor 103 will apply a logic (H) to an input terminal of each of NAND gates 104, 105 (let's assume an AM event is stored at address $13_a$). For purpose of this illustrative example, the AND gates A-H are additionally identified with the circled addresses $8_a$–$15_a$, respectively. The AM/PM information associated with the stored event will cause a logic (H) to issue from the AM terminal of the memory. Logic (H's) are now applied to both input terminals of AM NAND gate 105 causing its output terminal to go logic (L). AM gate 93 has already been enabled by virtue of a logic (H) applied thereto from the output of flip-flop 49 so that all the cathode terminals of all the AM sections of the A-H LED's are now maintained at the logic (L) potential of NAND gate 105.

At the same time that READ counter 81 is scanning the memory, oscillator $F_2$ simultaneously effects a scan of terminals $T_1$-$T_4$ of decoder 96 through the (0–3) counter 95 and, a scan of the second input terminals of AND gates A-H via divider 97 and inverter 94. Therefore, at such time coincidence as the output of $T_2$ applied to the first input terminal of AND gate $F(13_a)$ is (H) and the output of inverter 94 to the second inut terminal of gate $F(13_a)$ is also (H), then one of the dual LED's assigned to that gate will be illuminated if either the AM line 98 or the PM line 99 is at logic (L). As noted above, under the event condition assumed, the memory in response to a reading by counter 81, caused the AM NAND gate to go (L). Therefore, with AM line 98 maintained (L), each time the input terminals of AND gate F go (H), the GREEN LED assigned to gate F will be illuminated. Moreover, since this scansion occurs at a 60 Hz rate, the LED at $F(13_a)$ will appear to be constantly illuminated.

At this stage, the details of the programmed event, other than that it is an AM program on Monday (address $13_a$), are not known. The specifics of the event are ascertainable by recourse to the EDIT control the operation of which will be detailed upon completion of this description of the programming procedure.

Accordingly, the day of the week (Monday) selected and the array 20 of event designators having been reviewed to determine that, while an event has been programmed at address $13_a$ (AND gate F), address $8_a$ is available for storing the desired Monday event, programming is resumed. Recall now that the WRITE counter 80 has been preset to Monday, and that a previous actuation of the EDIT control has readied WRITE counter 80 to commence writing at address $8_a$. Since time gate 55 has been rendered conductive, controls 34 and 36 are adjusted to select an 8:30 PM "on" time for the desired event. When this time has been selected, "8:30 PM" will be visually presented on time display 32. Next, control 40 of tuning system 42 is adjusted until "0:5" (Channel 5) is displayed on channel read-out 38. Finally, control 46 of the duration timer is adjusted until duration display 44 reads "2:5".

Since transmission gates 56, 65 and 71 were enabled when the (P) mode was instituted, the "on" time, channel and duration data now appears at the respective data-in terminals $T_{in}$, $C_{in}$ and $D_{in}$ of the memory. However, the data is not loaded into the memory until the address lines are activated. The ENTER control 48 is now actuated which causes the preset address ($8_a$) of WRITE counter 80 to be applied via switch 87 to the WRITE terminal of R/W control 89. Note that READ counter 81 has simultaneously been disconnected from control 89. During this ENTER mode, the address comparator 90 is disabled (see Truth Tables in FIG. $1_b$) so that the WRITE line binary address data is applied to the R/W terminal of the memory. The selected program data appearing at the several data-in terminals are then inserted into the memory at the preset address ($8_a$). When the ENTER control is released, the output of the WRITE counter is returned to the input of address comparator 90, READ counter 81 output is re-applied to the R/W terminal of the memory via R/W control 89 and the (0–7) address counter 84 advances one count to preset WRITE counter 80 to address $9_a$ so that the memory is prepared to receive another Monday event. As a result, the red (PM) LED for the event designator of AND gate A will be illuminated to indicate that a PM event has been programmed at memory address $8_a$ and the memory has been conditioned to receive and store the next MONDAY event. It should be obvious. of course, that programming for any other day of the week utilizes, in substance, the same procedure as described above.

The operation of the system in the EDIT mode will now be described. The master control 18 is again displaced in the PROGRAM (P) position and the DAY selector switch 26 is actuated until the LED for the day-of-the-week on which the program desired to be edited is illuminated. It will be assumed that one wishes to edit the event that is programmed for Monday at address $13_a$. Accordingly, the DAY selector switch 26 is actuated until the Monday LED in bank 22 is illuminated. This action will preset WRITE counter 80 so that it will only count through addresses $8_a$ through $15_a$. The array of event designators 20 is then viewed to determine how many events have been programmed for Monday. Since we have events located at addresses $8_a$ and $13_a$, a RED LED will be illuminated at AND gate A for the former while a GREEN RED will be illuminated at AND gate F for the latter. It will be recalled that an LED in the array 20 of event designators cannot be illuminated unless there is complete data in the memory at an address assigned to that LED, therefore, for the case at hand, only two LED's are illuminated.

Now in order to edit, or review, the event that has been stored at address $13_a$, the EDIT control 24 is actuated. Immediately, EDIT/RESET control 82 resets address counter 84 to binary zero. In order to get to memory address $13_a$, the ENTER control must be repeatedly actuated (one actuation for each count) until the (0-7) address counter 84 counts to binary five, which binary signal corresponding to address $13_a$ on Monday. Actually, whenever counter 84 reaches an address in which an event is stored, and the EDIT control is depressed, the LED designator for that event will flash continuously so long as the control is held down. At the same time, the event data describing the located event will be posted on the time, channel and duration displays and, those displays will also blink. The blink rate and the manner in which the blinking is generated will be described in a moment.

Each time the EDIT control is actuated, the address data comparator 90 and the toggle flip-flop 49 are enabled. The output of READ counter 81, which has been constantly scanning addresses $8_a$–$15_a$ in the memory, remains applied to one terminal of the address data comparator 90. Since the output of WRITE counter 87 is applied to the other input terminal of comparator 90, when the preset address $13_a$ is compared to the address data supplied by READ counter 81, a data coincidence will occur each time counter 81 scans past address $13_a$. When such coincidence occurs a positive-going output pulse having a period of 1/480 sec. appears at the output of comparator 90. The repetition rate of these positive-going pulses is 60 Hz, which rate is determined by the fact that the block of eight addresses are scanned by the 480 Hz $F_2$ oscillator and since one pulse is generated during this scan the repetition rate of the pulses is (480/8=60 Hz. This positive-going pulse triggers flip-flop 49 from its normal output state of logic (H) to a logic (L) output. The output of flip-flop 49 remains (L) until receipt of the next positive-going pulse from the comparator output. Now, since it requires two comparator output pulses to drive the flip-flop from its normal (H) state to (L) and then back to (H), the repetition rate of the flip-flop output is one-half that of the comparator pulses, or 30 Hz. Since a 30 Hz rate of change in illumination is readily detected visually, this 30 Hz pulsing output of the flip-flop will be utilized as a visual indicator of the EDIT mode.

More particularly, the positive-going output pulse of comparator 90 is also applied to one input terminal of NAND gate 61 while the output of the flip-flop is coupled to the other input terminal of gate 61. As a result, the output of gate 61 will alternate between (L) and (H) at a 30 Hz rate and control signals pulsating at that rate are applied directly to the PM and AM transmission gates 92, 93 and, via inverter 60, to time-out, channel-out and duration-out gates 59, 62 and 76, respectively. Accordingly, during the EDIT mode, a logic (L) signal will be applied to the time, channel and duration transmission gates 55, 63 and 74 to prevent translation of any data from the clock, tuner or duration timer to their associated displays. At the same time, pulsating gating signals from the flip-flop will be applied to the PM and AM transmission gates 92, 93 and to the time-out 59, channel-out 62 and duration-out 76 gates so that the LED associated with address $13_a$ will blink at a 30 Hz rate, as will the data scanned at address $13_a$ in the memory and posted on the time, channel and duration displays 32, 38 and 44.

When a system is in the EDIT mode and it is decided that, upon review of the data displayed for the edited event, any element of the event information, such as time, channel or record duration is to be changed, the system is returned to the ENTER mode. Let's assume it is desired to change the Monday AM event to a Tuesday 9:00 PM program. With the EDIT control deactivated, counter 28 is actuated to select Tuesday which causes decoder 30 to condition address circuit 79 to preset the starting count for WRITE and READ counters 80, 81 at address $16_a$ of address block $16_a$–$23_a$. The new data information for Tuesday PM is selected and posted on the displays. Thereafter, the ENTER control is actuated which will insert the newly selected information into the memory at address $16_a$. Since the memory will only store last inserted information, and previous event data at address $16_a$ is automatically erased.

Finally, the AUTOMATIC (A) mode will be described. It will be assumed that the previously mentioned Monday and Tuesday events have been programmed into the memory, that the master control 18 is positioned to AUTOMATIC and that the "real" day of the week is Sunday.

In the (A) mode of operation, the internal clock circuit in clock 14 maintains "real" time and displays it on read-out 32 while the bank 22 of DAY LED's indicates that the current calendar DAY is SUN. The channel and record duration displays 38 and 44 are blanked. At 12:01 AM Monday, a reference signal issuing from clock 14 is applied through switch 54 to counter 28. This reference pulse increments the DAY counter 28 so that it will output a binary signal representative of Monday and cause the (1 to 7) decoder 30 to illuminate the LED indicator for MON and extinguish the SUN LED. Decoder 30, which controls the preset circuit 79, causes that circuit to preset READ counter 81 to commence counting through the block of addresses $8_a$–$15_a$ (assigned to Monday), which block of addresses are continually scanned by the memory scan counter 86. The scanned output of READ counter 81 is applied to the R/W terminal of memory 16 to continually scan the data stored in the address block $8_a$–$15_a$ of the memory.

Recall now that the event pre-programmed for Monday evening is scheduled to start at 8:30 PM on channel 5 and that a VCR record time of 2¼ hours is desired. At all times when the system is in the AUTOMATIC mode, "real" time from clock 14 is applied to one input terminal of the time coincidence comparator 100. The other input terminal of this comparator is coupled to the $T_o$(time-out) terminal of memory 16. Time coincidence comparator 100 thus constantly monitors the turn-on time for any event stored in the address block being scanned by READ counter 81. Accordingly, at 8:30 PM, comparator 100 will detect a time coincidence between "real" time and event time (8:30 PM) and initiate a series of pulses at its output terminal. This series of pulses which lasts for one minute is applied via switch 101 and connection 102 to a control terminal of duration timer 69. The first pulse in the series initiates duration timer operation and, although the series of pulses will stop when clock 14 advances to the next minute of "real" time, as will be shown, the duration timer will continue to operate for the length of programmed record time.

When activated, duration timer 69 furnishes an enabling signal, a logic (H), to a control terminal of the tuning transmission gate 17 as well as to the VCR proper. When gate 17 is enabled, it couples memory stored binary coded information signals representative of channel 5 to tuning system 42 of the VCR. This tuning system, in turn, conditions the VCR for operation on channel 5. The effect of the enabling signal (H) on the VCR proper is to activate its energizing circuits.

While, as noted, the turn-on time for the VCR is initiated by comparator 100, thereafter the duration timer assumes control of the VCR. More particularly, at time coincidence (8:30 PM), record duration information stored in the memory 16 is applied as a binary coded information signal to duration time decoder 70 from the memory via memory terminal $D_o$ and duration transmission gates 76 and 74. At the instant timer 69 receives the initiating pulse from comparator 100, it begins to count "up" in binary. Timer 69 will continue to count until it reaches the binary number that is equal to the binary number equivalent of 2¼ hours, that is, equivalent to the binary coded signal received by decoder 70 from the $D_o$ terminal of the memory. At that time, that is, at the end of the programmed record mode (2¼ hours), decoder 70 generates a control signal which is fed back to timer 69 through connection 77 to turn off the timer and reset it to binary zero. When timer 69 is thus deactivated, the output signal from the timer appearing at terminal $S_e$ returns to logic (L), which signal being simultaneously applied to the tuner transmission gate 17 and to the VCR energizing circuitry, serves to completely deactivate the tuner and the VCR.

Thereafter, at 12:01 AM Tuesday, a reference signal again issues from clock 14 and is applied to counter 28. In the manner described above, DAY counter 28 outputs a binary signal representative of Tuesday and causes the (1 of 7) decoder 30 to illuminate the LED indicator for TUE and extinguish the MON LED. Decoder 30 now causes circuit 79 to preset READ counter 81 to commence counting through the block of addresses $16_a$–$23_a$ assigned to Tuesday, and this block of addresses is now continually scanned by memory scan counter 86. The scanned output of READ counter 81, which is applied to the R/W terminal of memory 16, initiates a continual scan of the data stored in the address block $16_a$–$23_a$ of the memory.

Subsequently, when the pre-programmed time for the Tuesday event coincides with real time, comparator 100 initiates the series of pulses that activates duration timer 69. In the manner already described, the VCR operation is initiated and terminated by the pre-programmed data for this Tuesday event in the memory. Insofar as the other functions of master control 18 are concerned, the OFF position disconnects the memory system from the VCR without, of course, loss of memory programming and deactivates the VCR as well.

The ON position, on the other hand, serves to by-pass the memory system to permit the viewer to operate the VCR in a RECORD or playback mode at will.

In summary, there has been described, an addressable event display and control system for use with a clock controlled programmable memory. The event display and control panel presents an orderly arrangement of controls which can be readily comprehended by the viewer. The flexibility of the described arrangement is apparent in view of the facility with which up to 8 events per day for a period of one week can be programmed into the system and, in view of the relative ease with which programmed events can be readily reviewed or edited.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. An addressable event display and control system for use with a clock controlled programmable memory having the capability of storing a multitude of time related program events, which events are utilized, chronologically, for controlling a video frequency recorder, the content of each said event comprising a plurality of pieces of information, said event display and control system comprising:

an array of light-emitting devices coupled to the memory, each of said devices constituting an event designator and signifying, when energized, storage of a programmed event in the memory;

a bank of light-emitting day-of-the-week indicators also coupled to the memory, as well as to said array, and selectively energizable to visually identify a particular day;

means for selecting a particular one of said day indicators;

means responsive to selection of said particular day indicator for interrogating said array of event designators to ascertain which of said designators have been programmed for said particular day;

means for selecting a desired one of said event designators for said particular day to afford review of the program content of said selected event designator;

visual signaling means, responsive to said designator selecting means, for identifying said selected event designator;

programming means, including visual readout means, for selecting and visually displaying the time, channel and recording duration information that identifies an event to be associated with said selected event designator; and means for entering said program information into the memory for subsequent retrieval upon said selected day to control the recorder.

2. An addressable event display and control system in accordance with claim 1 in which said array of light-emitting devices comprises a plurality of light-emitting diodes (LED's) individually constituting one of said event designators.

3. An addressable event display and control system in accordance with claim 2 in which each of said LED's comprises a dual section light-emitting diode and which further includes means for illuminating one section of said dual diode to signify storage of am AM program and for illuminating the other section of said dual diode to signify storage of a PM program.

4. An addressable event display and control system in accordance with claim 1 in which said bank of light-emitting day-of-the-week indicators comprises a plurality of light-emitting diodes (LED's) individually constituting one of said day indicators.

5. An addressable event display and control system in accordance with claim 1 in which said means for interrogating said array of event designators comprises a READ counter:
scanning means for driving said counter; and
means for applying the output of said READ counter to a predetermined address in said memory.

6. An addressable event display and control system in accordance with claim 5 which further includes a WRITE counter;
a memory address preset circuit responsive to said means for selecting a particular one of said day indicators; and
means for coupling the output of said preset circuit to said WRITE counter and to said READ counter for conditioning said counters to count only within a preset block of addresses.

7. An addressable event display and control system in accordance with claim 1 which further includes a clock timer for controlling said means for selecting a particular one of said day indicators.

8. An addressable event display and control system in accordance with claim 1 which further includes means for causing said array of event designators and said visual readout means to blink at a predetermined rate to signify that the program content of said selected event designator is under review.

9. An addressable event display and control system in accordance with claim 1 which further includes means for selectively establishing said system in AUTOMATIC and PROGRAM modes.

* * * * *